United States Patent

Lappin et al.

[11] Patent Number: 5,836,456
[45] Date of Patent: Nov. 17, 1998

[54] DISCRETE MATERIAL WASHING APPARATUS

[75] Inventors: Thomas James Lappin; Robert Leslie Pickering, both of Tandragee, United Kingdom

[73] Assignee: Rapid International Limited, Tandragee, United Kingdom

[21] Appl. No.: 646,316
[22] PCT Filed: Nov. 11, 1994
[86] PCT No.: PCT/GB94/02491
§ 371 Date: May 13, 1996
§ 102(e) Date: May 13, 1996
[87] PCT Pub. No.: WO95/13140
PCT Pub. Date: May 18, 1995

[30] Foreign Application Priority Data

Nov. 11, 1993 [GB] United Kingdom .................... 9323331

[51] Int. Cl.⁶ ...................................................... B07B 1/22
[52] U.S. Cl. ............................ 209/246; 209/270; 209/284; 209/288
[58] Field of Search ..................................... 209/243, 246, 209/268, 270, 284, 288

[56] References Cited

U.S. PATENT DOCUMENTS

| 2,228,185 | 1/1941 | Thompson . |
| 3,278,022 | 10/1966 | Moeschler . |
| 4,127,478 | 11/1978 | Miller .................................. 209/270 X |
| 5,082,553 | 1/1992 | Tanii . |
| 5,248,042 | 9/1993 | Kuhmonen . |
| 5,427,250 | 6/1995 | Page et al. ............................... 209/284 |

FOREIGN PATENT DOCUMENTS

| 3034451 | 5/1982 | Germany . |
| 5662557 | 5/1981 | Japan . |
| 414809 | 8/1934 | United Kingdom . |

Primary Examiner—David H. Bollinger
Attorney, Agent, or Firm—Edwin E. Greigg; Ronald E. Greigg

[57] ABSTRACT

A discrete material washing apparatus comprises a structure mounting an elongate trough having an inlet and an outlet. A dished tray is mounted on the structure and shaped to feed into the inlet. The tray is to receive disposal of a cementitious mixture therein. A cylindrical screen has a net surface. The screen extends substantially along the length of the trough and is adapted for rotation. Water spray is provided to play on any mixture disposed onto the tray and passed through the inlet into the interior of the screen for size classification with smaller particles able to pass through the mesh of the screen surface into the trough and larger particles remaining in the screen. A first mechanism is provided to remove the smaller particles from the trough, and a second mechanism is provided to remove the larger particles from the interior of the screen through the outlet of the trough. A weir is provided in at least one longitudinal side of the trough for removal of the cementitious water therefrom. A power mechanism is provided to rotate the screen and operate the first and second removal mechanisms. A gate mechanism is provided for operation to close off the inlet of the trough, the gate mechanism is operable responsive to a pressure monitoring device surveying throughput of mixture into the screen.

23 Claims, 8 Drawing Sheets

DISCRETE MATERIAL WASHING APPARATUS

This invention relates to a discrete material washing apparatus for the separation of a cementacious mixture, for example unused fluent concrete, into its original constituent parts and the removal of cementations water for disposal or to be recycled into future concrete batch production.

Fluent concrete made from mixing primarily, but not only, sand, stone aggregate and water is normally delivered in a mobile concrete mixer from a depot to a site for discharge, the mixer during travel and until the fluent concrete is discharged being rotated to keep the mixture from setting. On occasions, not all fluent concrete is discharged and is brought back in the mixer to be dumped at or near to a depot or other site. After all the fluent concrete is discharged, the mixer is partially filled with water to wash out the mixer ready for re-use. The washouts are also dumped.

Problems have occured due to the unenvironmentally-friendly disposal of unused fluent concrete or concrete mixer washouts which can cause highly alkaline, cementatious water to enter into surface and underground watercourses. European legislation is being proposed to prohibit such disposal.

It is an object of the present invention to provide an environmentally-friendly reclamation procedure which would meet the provisions of the proposed European legislation concerning disposal of cementations mixture and water thereby eliminating unsightly concrete dump sites and contamination of watercourses, the procedure involving reclamation of the original constitutent solid parts of the fluent concrete, ie. sand and aggregate, and the cementations water for recycling.

Accordingly, the present invention is a discrete material washing apparatus comprising a structure mounting an elongate trough having an inlet and an outlet, a dished tray mounted on the structure and shaped to feed into the inlet, the tray being to receive disposal of a cementations mixture therein, a cylindrical screen having a net surface, the screen extending substantially along the length of the trough and adapted for rotation, water spray means being provided to play on any mixture disposed onto the tray and passed through the inlet into the interior of the screen for size classification with smaller particles able to pass through the mesh of the screen surface into the trough and larger particles remaining in the screen, first means to remove the smaller particles from the trough, second means to remove the larger particles from the interior of the screen through the outlet of the trough, weir means in at least one longitudinal side for removal of the cementations water from the trough, and power means to rotate the screen and operate the first and second removal means.

Preferably, gate means are provided for operation to close off the inlet of the trough, the gate means being operable responsive to a pressure monitoring device surveying throughput of mixture into the screen.

The screen is preferably provided internally of its surface with a series of helically arranged deflector elements which act as a means to convey the larger particles along the screen from the inlet end to the discharge end during rotation of the screen. At the outlet end of the screen, a series of radial collector attachments are desirably secured thereto to collect the larger particles delivered by the deflector elements, rotation of the screen causing any particles on the collector attachments to be deposited sequentially on the second removal means as each attachment passes thereover for removal of the larger particles from the screen. An archimedean attachment is preferably fitted exteriorly of the screen to moved the smaller particles deposited on the bottom of the trough towards the first removal means as the screen is rotated.

Preferably also, the tray has an upstanding lip and is provided with a series of water discharge nozzles connected to a supply of water, the sprayed water being to aid in the movement of the cementations mixture. Water spraying means are provided externally of the screen to play onto the screen surface, the spraying means comprising an elongate spray bar extending the length of the screen to clean the screen surface and to provide water to wash the mixture into its separate constituents.

The first removal means preferably comprises at least one screw conveyor or auger provided in a casing extending from the bottom of the trough laterally therefrom at an inclined attitude for removal of the smaller particles from the trough to a suitable collection site or for further treatment.

The second removal means is preferably an inclined endless belt conveyor mounted outwardly of the trough and extending inwardly through the outlet of the trough, the inner end carrying a feed boot into which material from the collector attachments is deposited for removal to a suitable collection site or for further treatment. The upper flight of the belt is beneficially given a concavity by a series of idler roller arrangements secured to the conveyor under the belt. Each roller arrangement desirably comprising three low friction rotatable rollers arranged in a V configuration. A second water spray bar is desirably provided overlying the belt as it exits from the screen to spray water over the larger particles to ensure the removal of any remaining smaller particles, the water and any smaller particles running down the belt and into the trough The screen preferably has a carcass around which the net surface is secured. The carcass desirably has a series of three supports (depending on the length of the screen) spaced lengthwise along the shaft, each support having a collar journalled on the shaft and from which outwardly extends four equispaced spokes to carry three of four circumferencial members on which is secured the net surface. Each circumferential member is desirably of T cross-section, arranged stem outermost, having a lip on which the surface is fixed. The fourth member is provided at the outlet end on the outside of the collector attachments.

The archimedian attachment is preferably fitted between the circumferential members. The archimedian attachment is preferably oriented in a direction to feed smaller particles towards the first removal means whether this is located at the outlet end of the trough or intermediate the ends of the trough.

The weir is beneficially provided by at least one longitudinal slot along one side of the trough feeding into a chamber provided externally of the trough to collect the water and any lighter material of the smaller particles entrained therewith and from which it is piped for further treatment and disposal of the lighter material of the smaller particles.

The spraying means may be incorporated into the side of the trough along its top longitudinal side.

A monitoring system is preferably provided to monitor the throughput of cementations mixture by measuring the pressure on the screen. This system may comprise a monitoring device connected hydraulically to the gate, the device measuring the pressure on the screen above a preset level over which the gate is activated by extending a ram to push the gate downwards to close of the inlet. The gate may also be under the control biasing of two springs. When the pressure on the screen in above the predetermined level, the force on the ram exceeds that of the two springs to push the gate downwards to close off the inlet to prevent entry of any further cementatious mixture into the screen. This system beneficially acts as a safety mechanism preventing the screen of the discrete material washing apparatus from being overloaded and allowing an opportunity for processing of cementations mixture in the screen whereby the pressure on the screen reduces below the critical level at which stage the biasing force of the two springs is greater than that of the ram causing the door to open allowing the entry of further cementations mixture.

An embodiment of the present invention will now be described, by way of example, with reference to the accompanying schematic drawings, in which.

Figure 1:
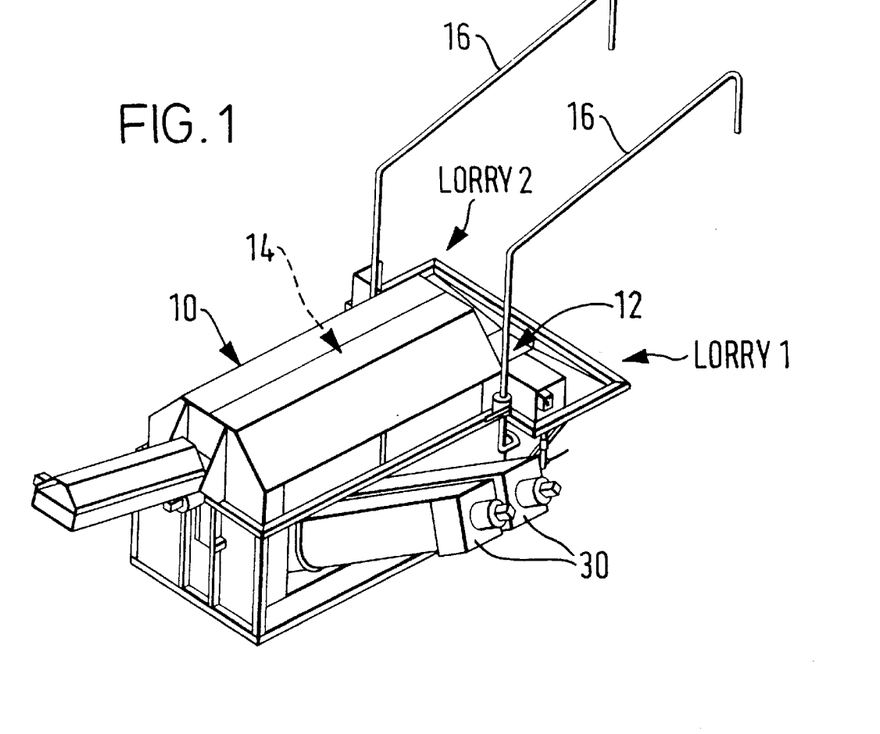
FIG. 1 is a perspective plan view of the discrete material washing apparatus according to the present invention.
Figure 2:
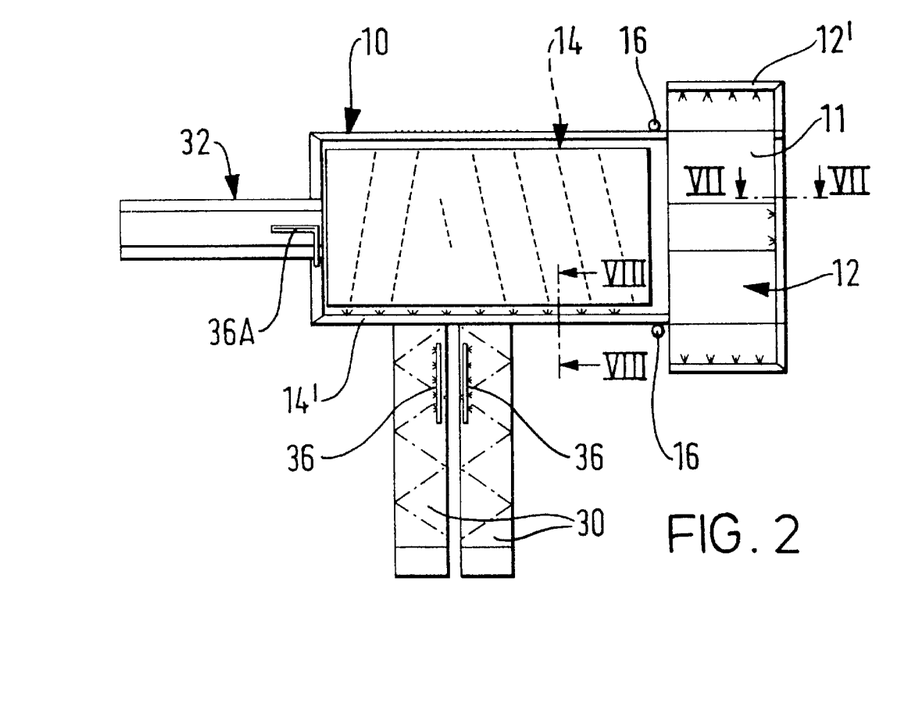
FIG. 2 is a plan view of the apparatus.
Figure 3:
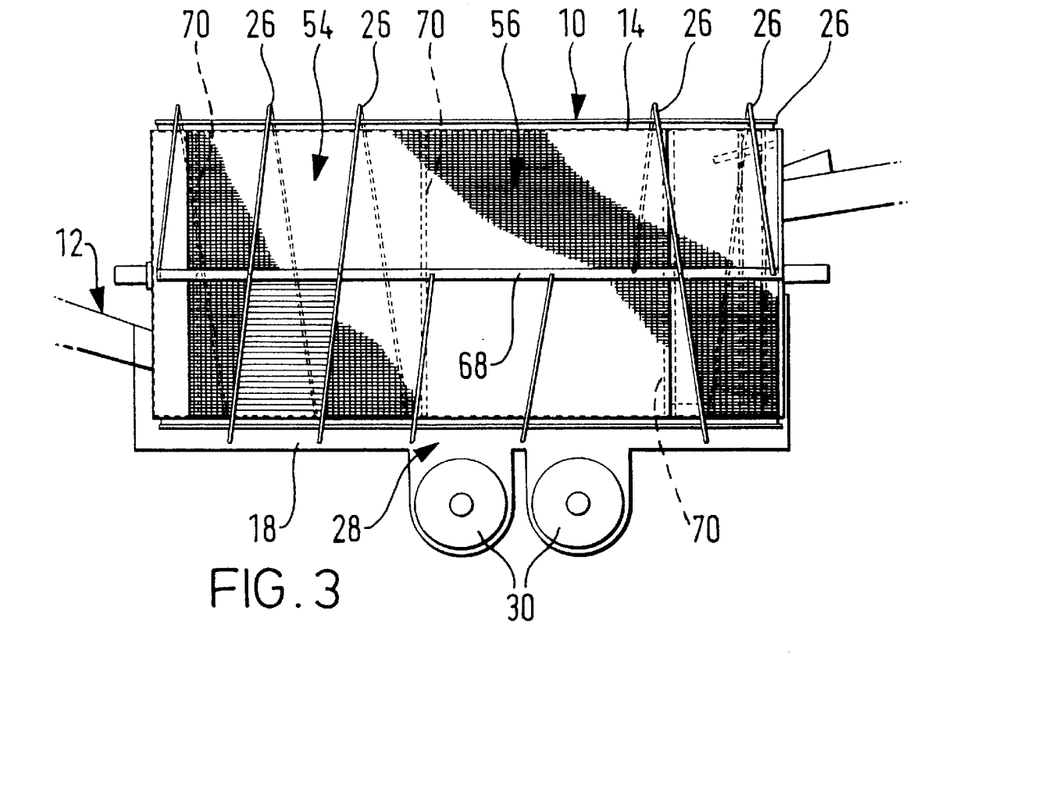
FIGS. 3 and 4 are side views of the apparatus respectively with and without a net surface on a screen.
Figure 4:
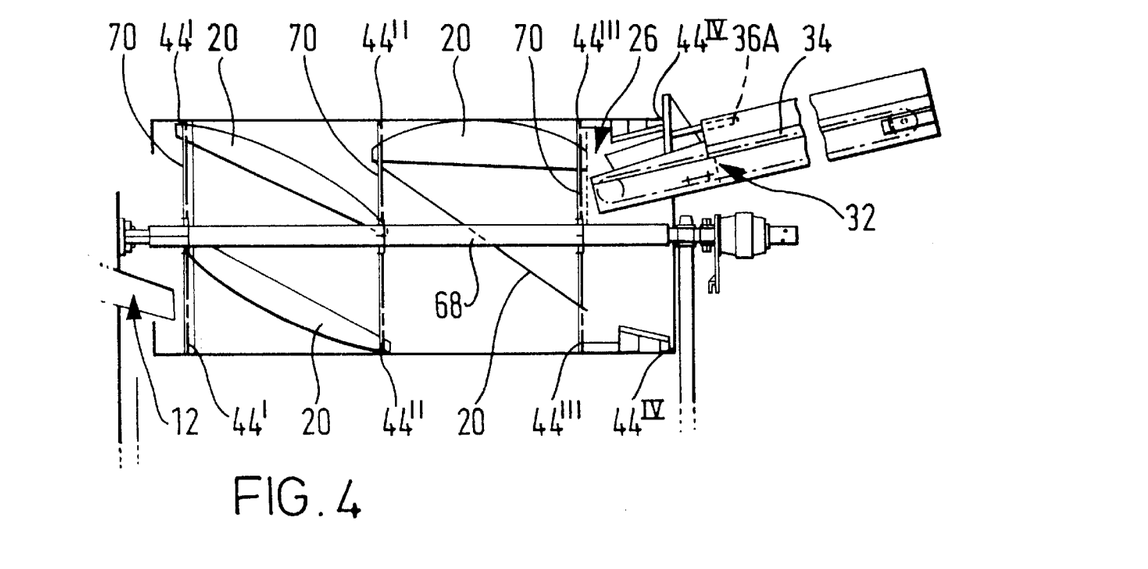
Figure 6:
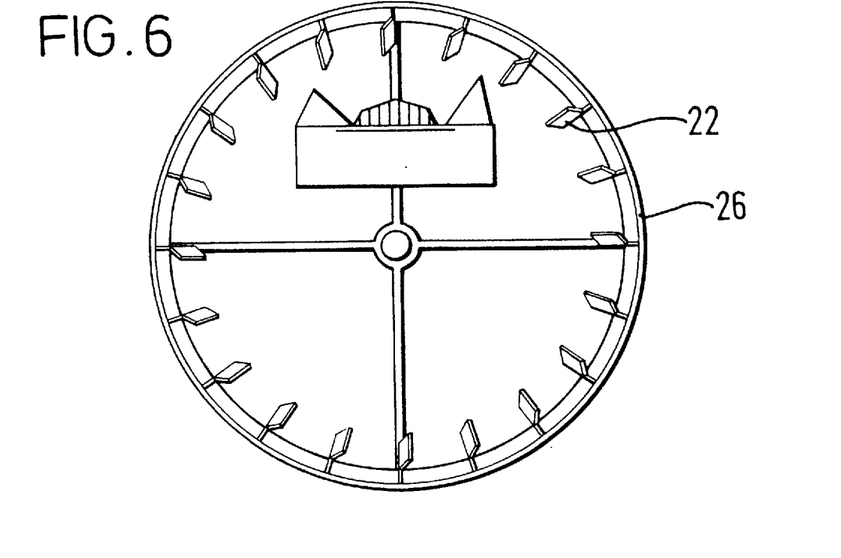
FIG. 6 is an end view of a screen showing second removal means.

Referring to the drawings, a discrete washing apparatus comprises a structure 8 mounting an elongate trough 10 having an inlet 12 and an outlet 13. A dished tray 11 is mounted on the structure 8 and shaped to feed into the inlet 12. The tray 11 is a size such that at least two lorries (not shown) can dispose of cementatious mixture therein at any one time. A cylindrical screen 14 extends substantially along the length of the trough 10. The screen 14 has a net surface 15 through which smaller particles, ie. sand, can pass. Water, if required, is sprayed onto a discharge chute of a mobile cement mixer from one or both of two movable water tubes 16 to aid in the delivery of the cementations mixture into the inlet 12 whereupon it is further sprayed by a first spraying means in the form of a series of water discharge nozzles 17. The sand passes through the screen 14 and remains on the bottom 18 while the lighter particles go into suspension and are entrained in the water. The screen 14 is rotated by power means and is provided with a series of helically arranged deflector elements 20 which act as a means to convey the larger particles, ie. stone aggregate, whereby when each deflector element 20 reaches the horizontal position during rotation of the screen 20 the contents thereon are emptied towards the discharge end and scoped by another deflector element 20 whereby to convey the larger particles along the screen 14 from the inlet end to the to the discharge end. Each deflector element 20 is offset at an acute angle of 45 degrees. At the discharge end of the screen 14, a series of collector attachments 22 are secured to an end portion 27 of the surface (FIG. 6). Upon rotation of the screen 14, the contents of each collector attachment 22 are discharged when it is near vertical into the second removal means 32. The sand is moved along the bottom 18 of the trough 10 by the action of a Archimedian attachment 26 fitted externally of the screen 14 and caused by the rotation of the screen 14 respectively to the discharge point at which first removal means are provided comprising two screw conveyors or augers 30 provided in a casing extending from the bottom of the trough 10 laterally therefrom at an inclined attitude for removal of the sand to a suitable collection site or for further treatment.

Figure 5A:
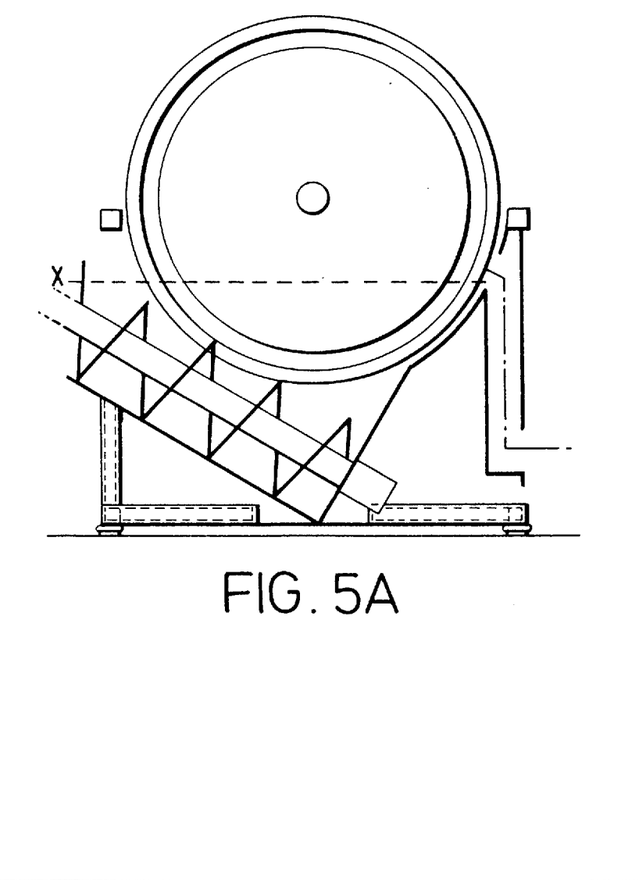
FIGS. 5A and 5B are a cross-sectional view on the line V—V of FIG. 2 and a side view of the apparatus respectively.
Figure 5B:
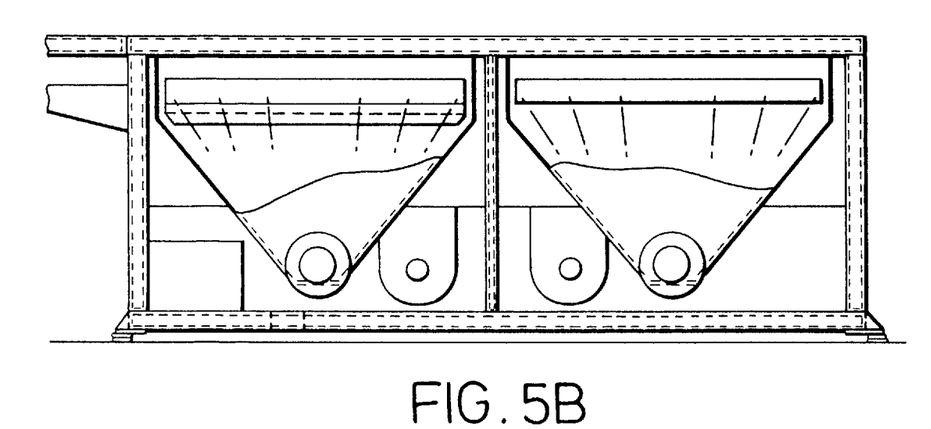

The second removal means 32 is provided substantially above the central axis of the trough 10 and comprises an inclined endless belt conveyor 34 provided with a spray bar 36A to spray water over the stones to facilitate the removal of any remaining fine particles. The weir 38 (FIGS. 5A, 5B) is provided by at least one longitudinal slot over which excess water flows, in order to reduce turbulence for further treatment or disposal of smaller particles which remain in suspension in the water.

Figure 15:
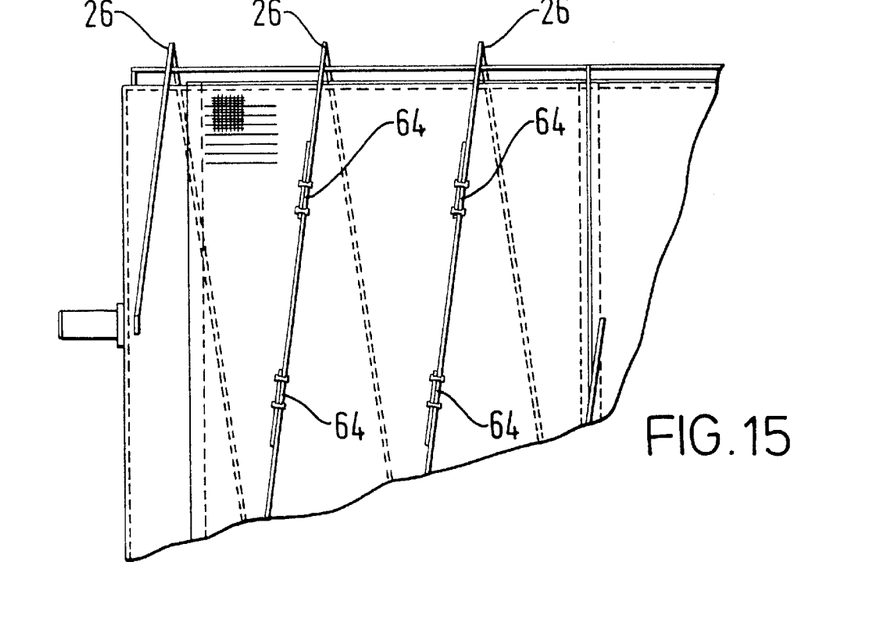
FIG. 15 is a side view of part of the screen showing couplings between parts of an Archimedian attachment.
Figure 16:
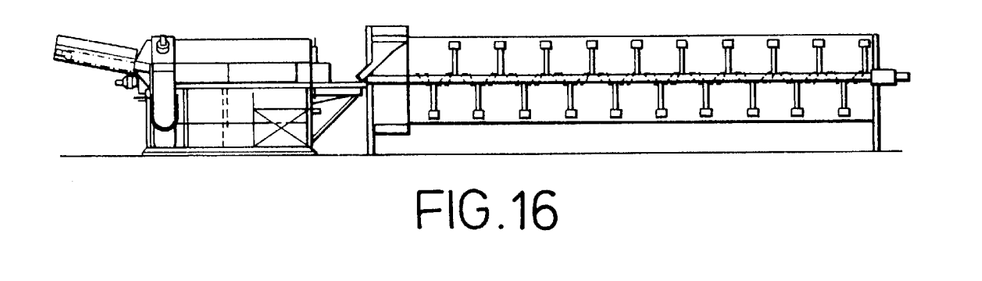
FIG. 16 is a side view of the apparatus showing also a surge tank feeding into the apparatus.
Figure 17:
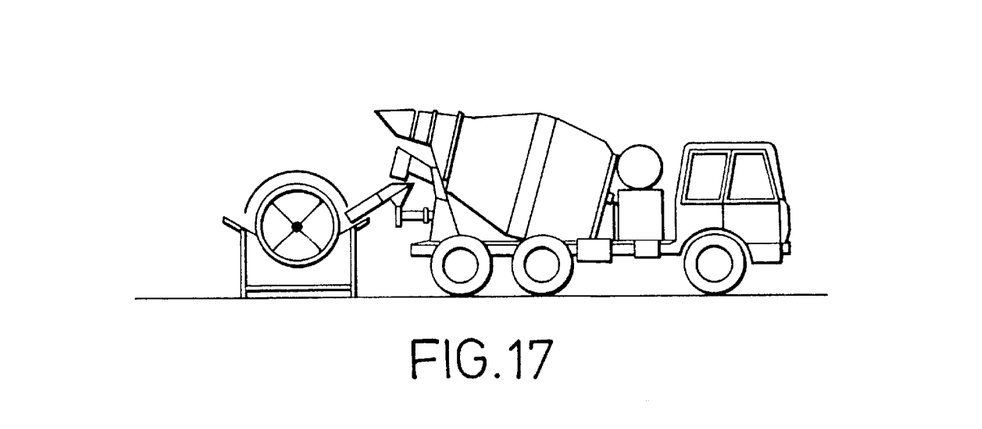
FIG. 17 is a cross-sectional view of a surge tank showing also a mobile concrete mixer positioned to discharge cementations mixture into the surge tank.

The screen 14 comprises four circumferal members 44 of T-section 48 having a lip on which is secured a frame 46 having an inner coarse mesh 52 with 20 mm opening welded over the lip 50 between the inlet, first circumferal member 44 and second circumferal member 44 forming a first section 54 and likewise a section 56 between the second circumferal member 44 and third circumferal member 44. The outer fine mesh 58 is secured over the inner coarse mesh 52 in each respective section by two belts 60 on the lip 50 which can be tightened to the required tension to maintain the fine mesh in position. The Archimedian attachment 26 is fitted exteriorly of the screen to the exterior fitment 62 which is secured between the T section. Four of these are provided in each section with the Archimedian attachment extending therearound with one quadrant (FIG. 15) of the Archimedian attachment in both respective sections being removable having a coupling mechanism 64 in order to allow the replacement of the outer fine mesh 58 when necessary.

The Archimedian attachment 26 is orientated in one direction in the first section to push the second towards the discharge section 28 from the inlet end 12 and in the second section the Archimedian attachment 26 is orientated in the opposite direction to push the sand towards the discharge section situated towards the centre of the bar 18 of the body 10.

Figure 7:
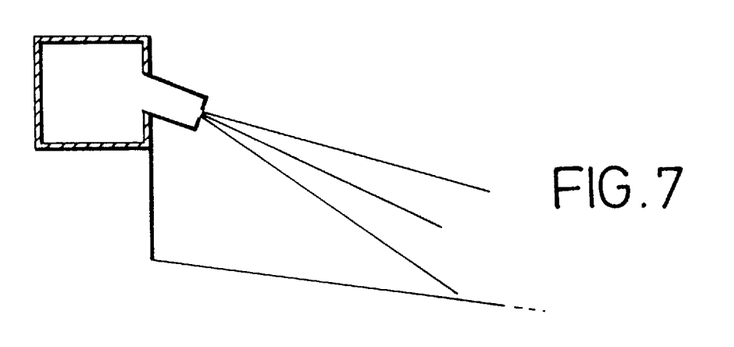
FIGS. 7 and 8 show cross-sectional details of a spray nozzle and of a spraying means on the lines VII—VII and VIII—VIII of FIG. 2.
Figure 8:
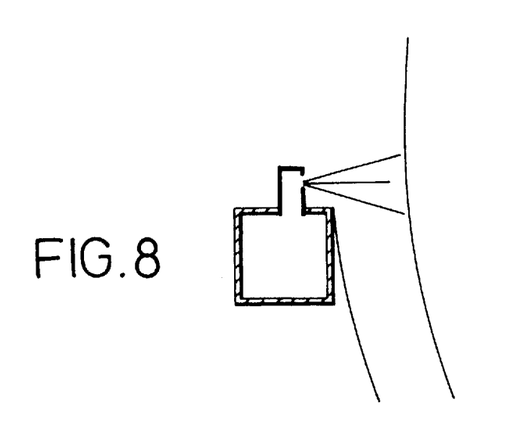
Figure 9:
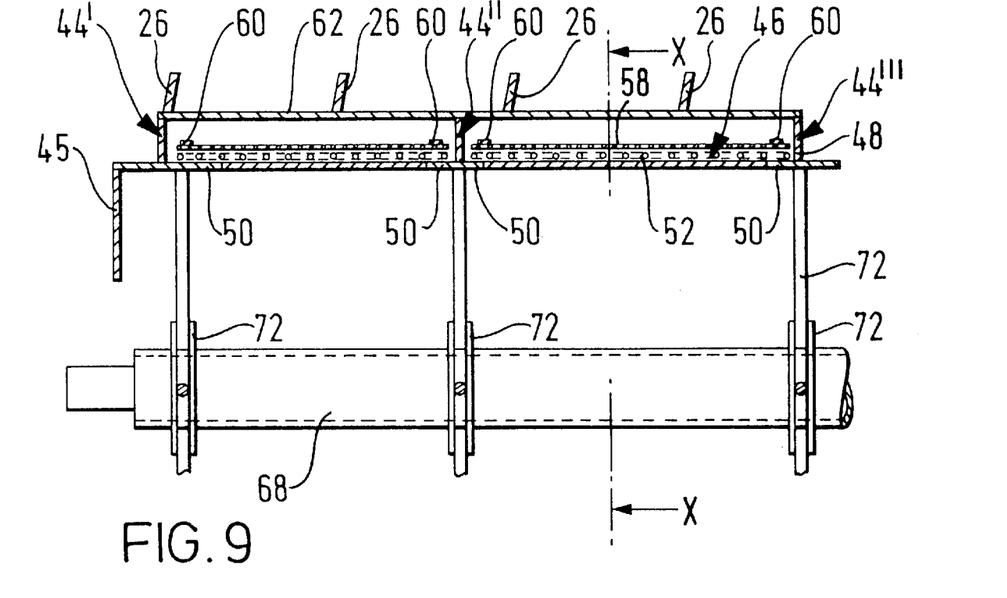
FIG. 9 is a side view of an upper section of a screen.
Figure 10:
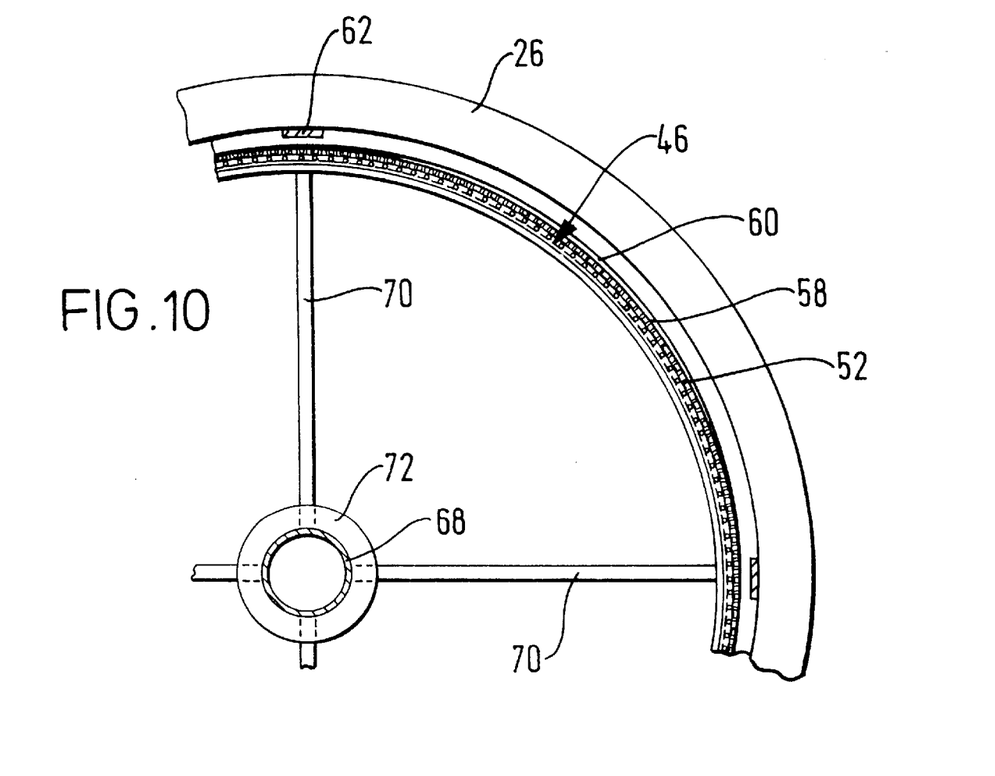
FIG. 10 is a section of a quadrant of the screen on the line X—X of FIG. 9.

A central shaft 68 is provided along the axis of the screen 14 having three series equidistantly spaced of four spines 70 on a collar 72 extending to the three circumferal member 44 from the inlet end a T section 48. The spraying means 74 is provided in the structure of the body 10 (FIGS. 7 and 8) along the sides 12 of the inlet 12 and along one side of the screen 14 to ensure that the discrete material is "wetted" sufficiently for the smaller particles to go into suspension.

Figure 11:
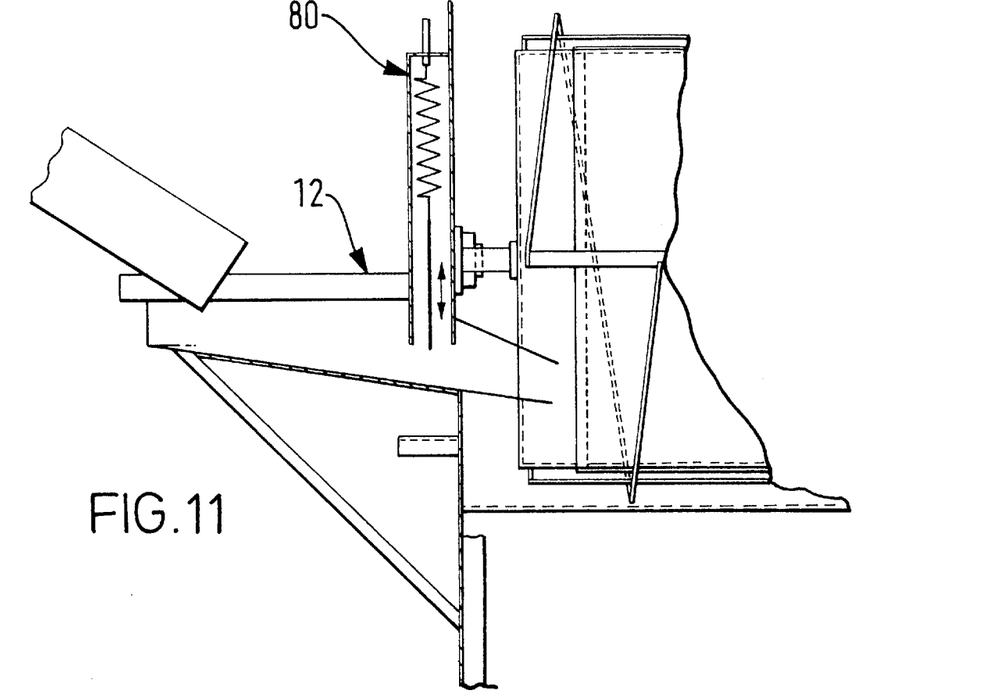
FIG. 11 is a side view of an inlet end of a trough with nearer side of a tray and the trough removed for clarity.
Figure 12:
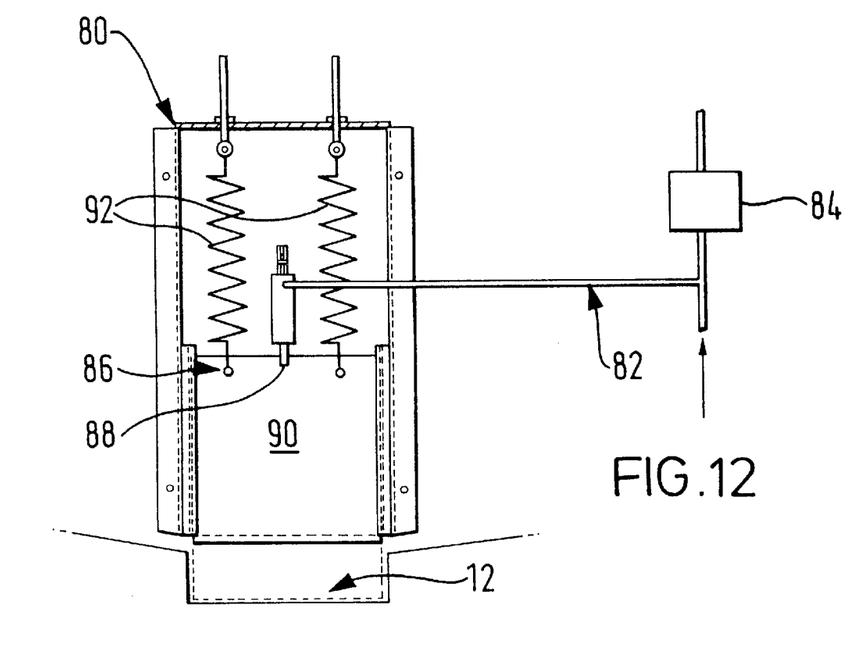
FIG. 12 is a front view of a gate shown in FIG. 11 and showing a monitoring system.
Figure 13:
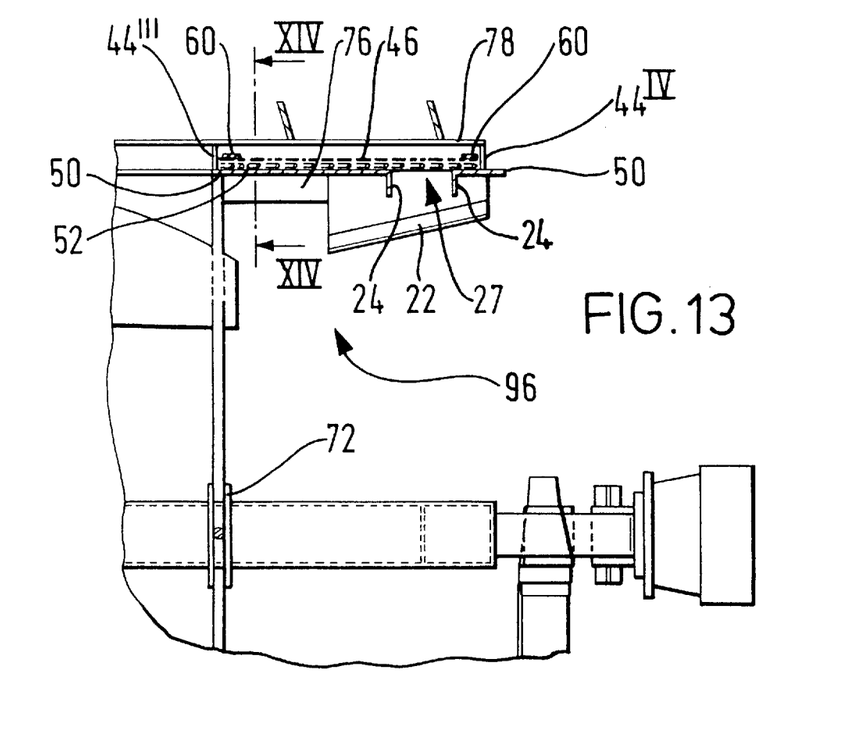
FIG. 13 is a side view of an upper section at the outlet end of a screen with parts removed for clarity.
Figure 14:
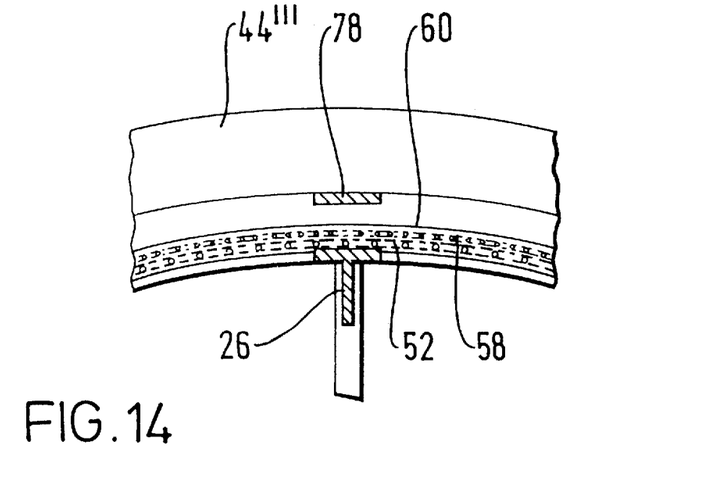
FIG. 14 is a cross-sectional view on the line XIV—XIV of FIG. 13 showing part of the screen and a circumferential member.

The T section 44 on the inlet end of the body extends partly over the inlet chute 11 and provided with an entry web 45. According to a second embodiment the discrete washing apparatus is provided with a monitoring system 80 (FIGS. 11 and 12) to monitor the throughput of waste, sand and smaller particles by measuring the pressure on the screen 14. This comprises a hydraulic system and a monitoring device 84 which measures the pressure on the screen 14. The screen is extended to a third section on the discharge end 96. The discharge end 96 having a series of four projecting elements 76 regularly spaced in parallel with a supporting member 78 is provided with an end circumferal member 44 of the ends thereof and further provided therein with a end collar 27 having a series at lungs 24 into which complementary vessel attachments 22 are secured. The screen is secured in the third section between the third 44 and end circumferal member respectively which is set a predetermined level overwhich a shutdown mechanism 86 is activated which operates a ram 88 to push a door 90 over the inlet 12 which is counteracted by a dual spring 92. When the pressure on the screen is above the predetermined level the force on the ram exceeds that of the dual spring 92 to push the door over the inlet to prevent the entry of any flier waste. The monitoring system 80 acts as a safety mechanism preventing the discrete washing apparatus from being overloaded and allowing it to clear the excess waste so that the pressure on the screen retards below the critical level, than the force on the dual springs 92 is greater than the ram, which pushes the door 80 open to allow entry of further waste.

Variations and modifications can be made without departing from the scope of the invention described above and as claimed hereinafter

We claim:

1. A discrete material washing apparatus comprising
    a structure mounting an elongate trough which has an inlet and an outlet,
    a dished tray mounted on the structure and shaped to feed into the inlet of the trough, the tray being to receive disposal of a cementitious mixture therein,
    a cylindrical screen having a net surface, the screen extending substantially along the length of the trough and adapted for rotation,
    water spray means being provided to play on any mixture disposed onto the tray and passed through the inlet into the interior of the screen for size classification with smaller particles able to pass through the mesh of the screen surface into the trough and larger particles remaining in the screen,
    first means to remove the smaller particles from the trough,
    second means to remove the larger particles from the interior of the screen through the outlet of the trough,
    weir means in at least one longitudinal side for removal of the cementitious water from the trough,
    gate means provided for operation to close off the inlet of the trough, the gate means being operable responsive to a pressure monitoring device surveying throughput of mixture into the screen, the device measuring the pressure on the screen above a preset level over which the gate is activated by extending a ram to push the gate downwards to close of the inlet, and
    power means to rotate the screen and operate the first and second removal means.

2. Apparatus according to claim 1, wherein the gate is also under the biasing control of two springs.

3. Apparatus according to claim 2, wherein when the pressure on the screen is above the predetermined level, the force on the ram exceeds that of the two springs to push the gate downwards to close off the inlet to prevent entry of any further cementitious mixture into the screen.

4. Apparatus according to claim 1, wherein the screen is provided internally of its surface with a series of helically arranged deflector elements which act as a means to convey the larger particles along the screen from the inlet end to the discharge end during rotation of the screen.

5. Apparatus according to claim 1, wherein at the outlet end of the screen, a series of radial collector attachments are secured thereto to collect the larger particles delivered by the deflector elements, rotation of the screen causing any particles on the collector attachments to be deposited sequentially on the second removal means as each attachment passes thereover for removal of the larger particles from the screen.

6. Apparatus according to claim 5, wherein the second removal means is an endless belt conveyor or mounted outwardly inclined of the trough and extending inwardly through the outlet of the trough, the inner end carrying a feed boot into which material from the collector attachments is deposited for removal to a suitable collection site or for further treatment.

7. Apparatus according to claim 6, wherein the upper flight of the belt is given a concavity by a series of idler roller arrangements secured to the conveyor under the belt.

8. Apparatus according to claim 7, wherein each roller arrangement comprises low friction rotatable rollers arranged in a V configuration.

9. Apparatus according to claim 6, wherein a second water spray bar is provided overlying the belt as it exits from the screen to spray water over the larger particles to ensure the removal of any remaining smaller particles, the water and any smaller particles running down the belt and into the trough.

10. Apparatus according to claim 1, wherein an archimedean attachment is fitted externally of the screen to moved the smaller particles deposited on the bottom of the trough towards the first removal means as the screen is rotated.

11. Apparatus according to claim 10, wherein the archimedean attachment is oriented in a direction to feed smaller particles towards the first removal means whether this is located at the outlet end of the trough or intermediate the ends of the trough.

12. Apparatus according to claim 1, wherein the tray has an upstanding lip and is provided with a series of water discharge nozzles connected to a supply of water, the sprayed water being to aid in the movement of the cementitious mixture.

13. Apparatus according to claim 1, wherein water spraying means are provided externally of the screen to play onto the screen surface, the spraying means comprising an elongate spray bar extending the length of the screen to clean the screen and to provide water to wash the mixture into its separate constituents.

14. Apparatus according to claim 1, wherein the first removal means comprises at least one screw conveyor provided in a casing extending from the bottom of the trough laterally therefrom at an inclined attitude for removal of the smaller particles from the trough to a suitable collection site or for further treatment.

15. Apparatus according to claim 1, wherein the screen has a carcass around which the net surface is secured.

16. Apparatus according to claim 15, wherein the carcass has a series of supports spaced lengthwise along the shaft, each support having a collar journalled on the shaft and from which outwardly extends four equispaced spokes to carry a circumferential member on which members the net surface is secured.

17. Apparatus according to claim 16, wherein there are four circumferential members, each circumferential member being of T cross-section, arranged stem outermost, having a lip on which the net surface is fixed.

18. Apparatus according to claim 16, wherein the fourth circumferential member is provided at the outlet end on the outside of the collector attachments.

19. Apparatus according to claim 16, wherein the archimedean attachment is fitted between the circumferential members.

20. Apparatus according to claim 1, wherein the weir is provided by at least one longitudinal slot along one side of the trough feeding into a chamber provided externally of the trough to collect the water and any lighter material of the smaller particles.

21. Apparatus according to claim 1, wherein the spraying means is incorporated into the side of the trough along its top longitudinal side.

22. Apparatus according to claim 1, wherein a monitoring system is provided to monitor the throughput of cementitious mixture by measuring the pressure of mixture on the screen, the system comprising the monitoring device connected hydraulically to the gate.

23. Apparatus as claimed in claim 22, wherein the system acts as a safety mechanism preventing the screen of the discrete material washing apparatus from being overloaded and allowing an opportunity for processing of cementitious mixture in the screen whereby the pressure on the screen reduces below the critical level at which stage the biasing force of the two springs is greater than that of the ram causing the door to open allowing the entry of further cementitious mixture.

\* \* \* \* \*